(12) United States Patent
Watson et al.

(10) Patent No.: US 8,041,587 B2
(45) Date of Patent: Oct. 18, 2011

(54) INTEGRATED SAFETY MANAGEMENT SYSTEM

(75) Inventors: Julie M. Watson, Yukon, OK (US); Andrea M. Dennis, Tuttle, OK (US); Tamara L. Cole, Oklahoma City, OK (US); Michael T. Le, Yukon, OK (US)

(73) Assignee: Xerox Corporation, Norwalk, CT (US)

( * ) Notice: Subject to any disclaimer, the term of this patent is extended or adjusted under 35 U.S.C. 154(b) by 724 days.

(21) Appl. No.: 12/047,999

(22) Filed: Mar. 13, 2008

(65) Prior Publication Data

US 2009/0234698 A1    Sep. 17, 2009

(51) Int. Cl.
*G06F 17/50*    (2006.01)

(52) U.S. Cl. ....... 705/7; 705/9; 726/21; 726/4; 715/700; 700/79; 707/1; 707/102

(58) Field of Classification Search .................. 705/7, 9; 726/21, 4; 715/700, 764; 700/79, 83
See application file for complete search history.

(56) References Cited

U.S. PATENT DOCUMENTS

| | | | |
|---|---|---|---|
| 5,311,438 A * | 5/1994 | Sellers et al. ................... 700/96 |
| 5,664,112 A * | 9/1997 | Sturgeon et al. ................ 705/28 |
| 5,726,884 A | 3/1998 | Sturgeon et al. |
| 5,774,449 A | 6/1998 | Czachowski et al. |
| 6,341,287 B1 * | 1/2002 | Sziklai et al. ........................ 1/1 |
| 7,171,426 B2 | 1/2007 | Farmer et al. |
| 7,324,905 B2 | 1/2008 | Droubie et al. |
| 2003/0125998 A1 * | 7/2003 | McKenney et al. ............... 705/7 |
| 2003/0153991 A1 * | 8/2003 | Visser et al. .................... 700/79 |
| 2004/0088329 A1 | 5/2004 | Lundblad et al. |
| 2005/0273381 A1 | 12/2005 | Thomas |
| 2006/0089837 A1 * | 4/2006 | Adar et al. ....................... 705/1 |
| 2007/0226291 A1 | 9/2007 | Lundblad et al. |
| 2008/0040191 A1 * | 2/2008 | Chakravarty et al. ............. 705/9 |

OTHER PUBLICATIONS

"PSM: Osha Process Safety Guidance and Information", www.ehso.com/ProcessSafety.htm, pp. 1 to 5, Jan. 30, 2008.

* cited by examiner

*Primary Examiner* — Vanel Frenel
(74) *Attorney, Agent, or Firm* — Pepper Hamilton LLP

(57) ABSTRACT

An integrated safety management system includes a self inspection module, an incident management module, and a hazard reporting module. A corrective action module integrates the other modules. Each module accepts data corresponding to events or actions, accepts and displays completion indicators, and accepts and displays corrective action indicators.

21 Claims, 6 Drawing Sheets

| | Incident | Self Inspection | Hazard Reporting | Management of Change | Auditing | TBD | Centralized CA |
|---|---|---|---|---|---|---|---|
| 251 | ID# | ID# | ID# | ID# | Audit ID# & Finding # | | Module Item ID Number |
| 252 | Title | Tour Location and Inspection Item | Title | Title | Audit Title & Finding Title | | Module Item Description |
| 253 | Location | Sublocation | Hazard Area | Sublocation | Audit Type & Area | | Module Item Area |
| 254 | Date | Self Inspection Tour Date | Date Reported/Input | Date MOC Initiated | Date of Audit | | Module Item Created Date |
| 255 | Corrective Action ID# | Corrective Action ID# | Corrective Action ID# | Corrective Action ID# | Corrective Action ID# | | CA ID# |
| 256 | Date CA Created | Date CA Created | Date CA Created | Date CA Created | | | CA Created Date |
| 257 | CA Description and Casual Factor | Description | Description | Description | Description | | CA Description |
| 261 | Due Date of CA | | | | | | CA Due Date |
| 262 | CA Responsible Person | | | | | | CA Responsible Person |
| 263 | Logged User Creating the CA | | | | | | CA Added by Person |
| 264 | CA Confidential Indicator | | | | | | CA Confidential Indicator |
| 265 | CA Priority | | | | | | CA Priority |
| 266 | Added to CA for Tracking | | | | | | Status (one or more) |
| 271 | Close | Close | Close | Close | Close | | |

FIG. 2

CENTRALIZED USER DASHBOARD

WELCOME JULIE WATSON!
OKC – OKLAHOMA CITY MANUFACTURING SITE

Your Overview

Next Scheduled
Self Inspection Tour    Site and Grounds    2/29/2008

Self Inspection Open Items
Roof    7
Building 100 Warehouse    6

Open Corrective Action
Self Inspection    4
Incident    1
Hazard Reporting    3
MOC    0
Auditing    1

Cettrax Updates

| Module | Last Updated |
|---|---|
| Auditing | 10/4/2007 |
| Incident | 9/27/2007 |
| Self Inspection | 5/3/2007 |
| MOC | 3/8/2007 |
| Hazard | 2/9/2007 |
| Corrective Action | 8/29/2007 |

Audits scheduled for next 90 days [OKC]

| Type | Area | By Date |
|---|---|---|
| Process Audit | C of A's | 12/21/2007 |
| Process Audit | Operator Instructions | 12/21/2007 |

Incidents added in last 30 days [OKC]

| Date | Title | Lead Investigator | Closed Date |
|---|---|---|---|
| 10/31/2007 | 1103) Parking Lot Near Miss | | |

Hazards added in last 30 days [OKC]

| Date Entered | Title | | Closed Date |
|---|---|---|---|
| 10/11/2007 | 601) Condensate fumes | | |
| 10/11/2007 | 602) Ear plugs | | |

Hazards added in last 30 days [OKC]

| Date Entered | Title | Initiated By | Closed Date |
|---|---|---|---|
| 11/7/2007 | 265) Dedicated Dry Ice Cleaning Station | John Lee | |
| 11/5/2007 | 262) B400 Water Softener Upgrade | George Brown | |

*FIG. 3*

ALERT DEFINITION ALGORITHM

| | Define Watches (410) | | | Define Triggers (420) | | | Define Events (430) | | |
|---|---|---|---|---|---|---|---|---|---|
| Definitions | Description | Example | Definitions | Description | Example | Definitions | Description | Example |
| WatchID | Unique ID | 15 | TriggerID | Unique ID | 78 | EventID | Unique ID | 49 |
| OwnerID | Employee ID | 9772XX | OwnerID | Employee ID | 9772XX | OwnerID | Employee ID | 9772XX |
| CreationDate | Date watch created | 11/7/2007 | CreationDate | Date trigger created | 11/7/2007 | CreationDate | Date trigger created | 11/7/2007 |
| SiteID | User selects from list of sites | 1 | | | | TriggerID | Trigger that will cause event to run when the trigger's value is TRUE | 78 |
| WatchSQL | SQL Generated when user selects from possible watches | SELECT Count(tblIncDetails.IncDetailsID) | TriggerSQL | SQL Generated when user define triggers as a combination of one or more watches | IF (SELECT tblWatchesValue> =3 WHERE tblWatchesID=15, TRUE, FALSE) | EventSQL | SQL Generated when user selects event to run when triggers have a value of TRUE | sp_send_cdasys mail_htmlbody... (remaining too long to list) |
| Value | Numeric result of the WatchSQL statement | 3 | Value | Boolean result of the TriggerSQL statement | TRUE | ExecutedValue | TRUE/FALSE indicating if event was executed | TRUE (email was sent) |
| LastRunDate Time | Date/Time of last time watch SQL statement execution | 11/15/2007 0:35 | LastRunDate Time | Date/Time of last time watch SQL statement execution | 11/15/2007 4:35 | LastRunDate Time | Date/Time of last time watch SQL statement execution | 11/15/2007 4:35 |

FIG. 4

INTEGRATED SAFETY MANAGEMENT SYSTEM

BACKGROUND

Workplace safety activities require a significant commitment from today's employers. Entities such as large corporations and manufacturing facilities must manage a large amount of data, and they must ensure that a wide variety of employees are aware of responsibilities and due dates. They also seek better ways to ensure compliance with the wide variety of requirements that may stem from federal, state and local regulations, as well as from private initiatives such as total quality management and voluntary protection programs.

This disclosure describes methods and systems for improving safety management processes within an organization.

SUMMARY

In an embodiment, an integrated safety management system includes a self-inspection module, an incident management module, a hazard reporting module, and a corrective action module. The self inspection module accepts data corresponding to a site inspection, including an inspection completion indicator, and one or more self-inspection corrective actions. The incident management module accepts data corresponding to a safety-related incident, including an incident descriptor and one or more incident-related corrective actions. The hazard reporting module accepts data corresponding to a hazard review team finding, including a hazard descriptor, and one or more hazard-related corrective actions. The corrective action module integrates the self-inspection corrective actions, the incident-related corrective actions, and the hazard-related corrective actions. The system also may include modules for management of change, lock out/tag out procedures, and auditing. A user interface dashboard may provide a user with access to the self-inspection module, the incident management module, the hazard reporting module, and the corrective action module. The system also may include an employee database containing identification data and system access permission data for employees, wherein the permission data provides a level of authorization for each employee in the database to access or enter information contained in the various modules.

In another embodiment, a method of managing occupational safety activity includes (i) accepting, via an electronic interface, a selected event to be watched, a selected trigger value for the selected event, and an action for the selected trigger value; (ii) receiving data corresponding to a site inspection, a safety-related incident, and/or a hazard review team finding; (iii) determining whether the data corresponds to the selected event and the selected trigger value, and if so, generating a corrective action requirement based on the accepted action and automatically generating a notification of the corrective action requirement for a responsible employee.

The corrective action requirement may include a workflow including a task for at least one additional employee. The method may then include: (i) notifying the additional employee of the task; (ii) displaying, upon request of the responsible employee, a completion status for the task; (iii) accepting, from the additional employee, an indication of completion of the task; and (iv) changing the completion status after the indication of completion is accepted.

The method also may include: (i) automatically determining an authorization level of a user; receiving a selected a corrective action category from the user; (ii) automatically identifying, based on the user's authorization level and the selected corrective action category, completed corrective actions and pending corrective actions for the user, and (iii) automatically generating a report of corrective action efficiency based on the identified completed corrective actions and the identified pending corrective actions.

BRIEF DESCRIPTION OF THE DRAWINGS

FIG. 2 depicts a dashboard with various modules of an integrated safety management system.

FIG. 3 illustrates an example of a centralized user dashboard.

FIG. 4 illustrates an exemplary alert module.

DETAILED DESCRIPTION

This disclosure is not limited to the particular methodologies and systems described, as these may vary. The terminology used in the description is for the purpose of describing particular versions or embodiments only, and it is not intended to limit the scope. For example, as used in this document, the singular forms "a," "an," and "the" include plural references unless the context clearly dictates otherwise. In addition, the word "comprising" as used herein is intended to mean "including but not limited to." Unless defined otherwise, all technical and scientific terms used in this document have the same meanings as commonly understood by one of ordinary skill in the art.

The embodiments described herein include methods and systems that allow an employer, facility operator, or other manager to identify workplace hazards, control hazards, monitor improvements, and/or track corrective actions to completion. The system may include one or more databases and one or more modules that each implement various aspects of a system. As used herein, the term "module" can refer to either or both of: (i) a software component that causes an electronic device to accept various inputs and generate certain outputs; or (ii) an electronic input/output interface, such as a panel, frame, textbox, window or other portion of a graphic user interface.

Figure 1:
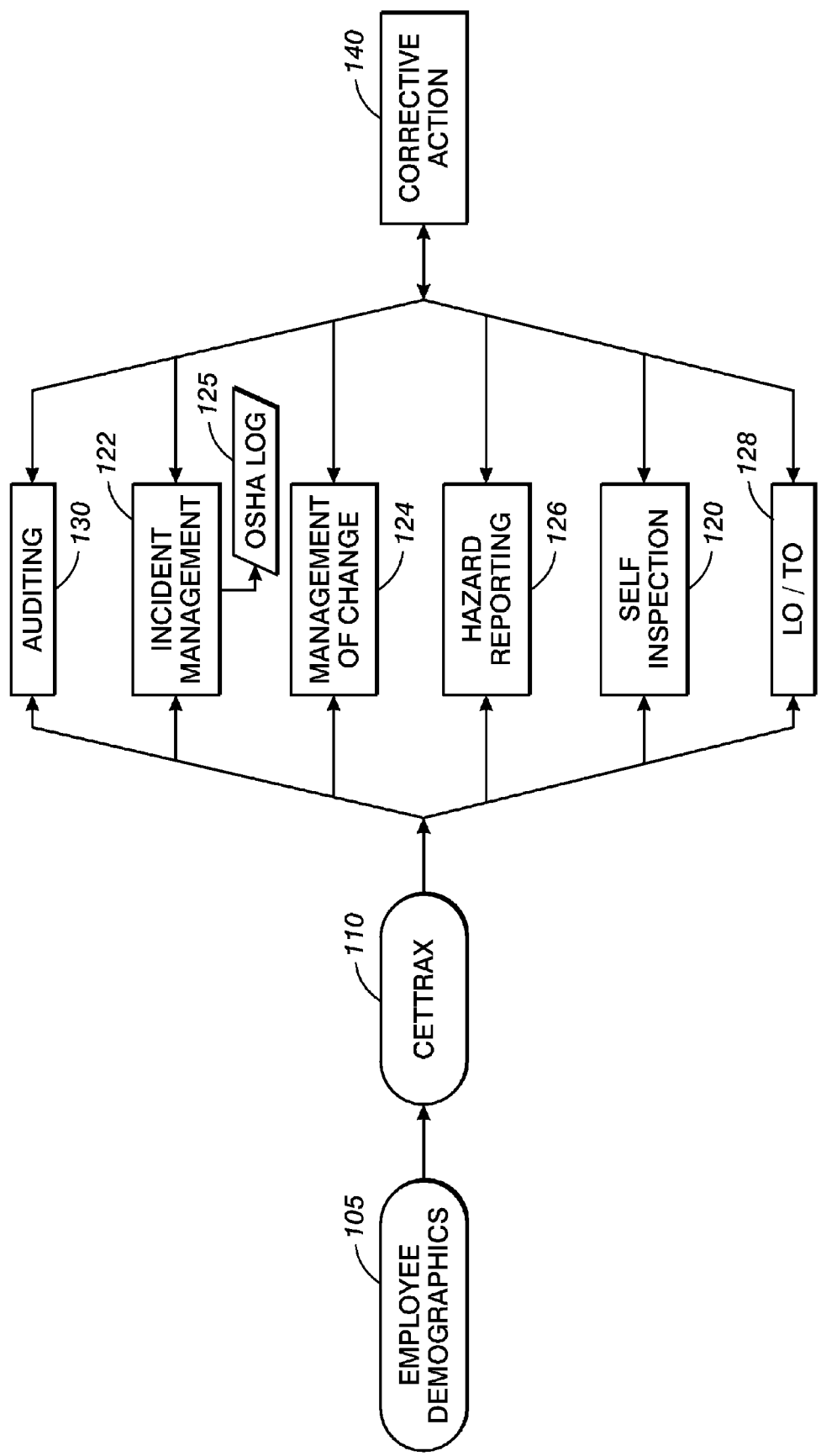
FIG. 1 is a block diagram that illustrates exemplary elements of an integrated safety management system.

Referring to FIG. 1, an integrated safety management system includes a database of employee demographic information 105. The demographic information may include information such as employee name, identification number, job title and/or function, work location, hire date, supervisor, direct reports (if any), and/or indirect reports (if any). The employee database also may include access permission indicators for each employee. For example, a supervisor may be given access to data corresponding to corrective action activity for each of that supervisor's direct and indirect reports, while access for a non-supervisory employee may be limited to his or her own data, as well as some general or aggregated data for the entire organization or a large part of the organization.

The system also includes an electronic processor and display 110 that implements the various modules on a user dashboard. As used herein, the term "dashboard" refers to a graphic user interface that displays output and accepts input for multiple modules. A dashboard typically includes a primary screen or home page with basic data for multiple modules, and a user can access individual module screens or pages via the dashboard in order to get additional detail about any one module. The processor and display 110 may implement a configuration engine that permits a responsible employee or administrator to selectively view information corresponding to criteria selected by the administrator, such as corrective action information relating to his or her direct and indirect reports.

The system may include any number of modules that operate via the dashboard and access the employee demographic data. For example, the system may include a self inspection module 120 that accepts and displays data corresponding to site inspections; an incident management module 122 that accepts and displays data corresponding to safety-related incidents; a management of change module 124 that accepts and displays data corresponding to manufacturing process changes, and which automatically generates a corrective action descriptor indicating that a written operating procedure must be updated; and a hazard reporting module 126 that accepts and displays data corresponding to hazard review team findings. A corrective action module 140 integrates the self-inspection corrective actions, the incident-related corrective actions, hazard-related corrective actions; and corrective actions from any or all other available modules.

Additional modules may include, for example, a lock out/tag out module 128 that manages employee lock out/tag out training obligations, and an auditing module 130 that interfaces with the corrective action module, automatically communicates scheduled audits to responsible employees, receives data corresponding to audit findings, correlates the findings to defined standards, and automatically generates audit-related corrective actions.

Any or all of the modules may interface with one or more databases or other data sources to store and retrieve information that is relevant to the module. For example, FIG. 1 illustrates that the incident management module 122 may obtain incident-related information from a log 125 of Occupation Safety and Health Administration (OSHA) data.

FIG. 2 illustrates an exemplary dashboard that displays a corrective action module 240 mapped to a variety of modules, including but not limited to an incident management module 222, a self inspection module 220, a hazard reporting module 226, a management of change module 224, and an auditing module 230.

Each of the modules may accept and/or display data such as an event or action identification code 251, a title or other description of the event or action 252, an event or action location 253, a date and/or time 254 of the event or action, a corrective action indicator 255 such as unique corrective action identification code, a date 256 that the corresponding corrective action was created, and a corrective action description 257. The dashboard may be configured to show events and actions that are related to each module or related a common corrective action 261. The dashboard also may accept and display items such as: the responsible person 262 for the event, action or corrective action; an identification of the user 263 who created the entry; an indication of whether any of the information should be confidential 264; a priority code 265; and/or a date 266 that the event, action or corrective action was added to the system for tracking. A user can log on and see his or her own events, actions and corrective actions, as well as those of his or her direct and indirect reports.

Optionally, the corrective action module may be configured to automatically notify responsible persons of their corrective actions at set intervals, such as daily, weekly, monthly, and/or within a set time period from each corrective action's due date, and/or in response to the receipt of certain data. This may be done by transmitting the notification to the responsible person by any appropriate method, such as email, text message, pop-up alert, or otherwise. For example, the notification may be transmitted to the responsible employee by displaying the notification on the dashboard the next time that the employee logs in to the system, or an update may be generated on a notification list on the main dashboard for a group of users. As an example, when the management of change module receives data indicating that a manufacturing process change has occurred, it may be configured to automatically generate a corrective action descriptor indicating that a written operating procedure must be updated. As another example, when a lock out/tag out module is provided, it may watch for indications that an employee will join a work site area. When it receives such an indication, it may automatically determine whether the newly located employee is required to undergo lock out/tag out training. If the employee is required to undergo lock out/tag out training, the system may automatically generate a corrective action descriptor indicating that the employee is required to undergo lock out/tag out training, and it may automatically notify the employee and/or his or her supervisor of the corrective action descriptor.

Optionally, any or all of the modules may include a check and balance to indicate whether an action has been closed. For example, FIG. 2 indicates that each module may receive a completion indicator 271 indicating the displayed action is closed. Optionally, the authorized individual who can enter a completion indicator may vary based on the module. For example, after an incident occurs, responsible people may close their own corrective actions, and once all corrective actions for an incident are closed an administrator may close the incident itself. In an audit, responsible people may close their corrective actions, a finding may be closed when all corrective actions for the audit team assigned to the finding have been closed, and the audit itself automatically may be closed when all findings for the audit have been closed. In some embodiments, any corrective action requirement may include a workflow descriptor including a task for at least one additional employee (i.e., a person other than the responsible employee). The system may notify the additional employee of the task, display a completion indicator 271 for the task upon request of the responsible employee, accept an indication of completion of the task from the responsible employee; and change the completion status after the indication of completion is accepted.

FIG. 3 illustrates an example of a centralized user dashboard 300 that may serve as a home page or initial screen for multiple modules. A user, which may include a responsible employee, supervisor, or any other authorized individual, may see summaries of any or all modules along with a personalized overview of scheduled activities and open items. For example, FIG. 3 illustrates that the dashboard may display a section listing open self inspection items 302 and open corrective action items 304, and it may display alerts 306 such as the next scheduled item for the particular user. The dashboard also may display aggregated information, such as an update section 310 that displays the last date that information for each module was updated. The dashboard also may serve as an interface to other modules. For example, an audit module interface 312 may display aggregated information such as all audits scheduled over a time period. An incident management module interface 314 may display all incidents added over a certain time period, or a preset number of recent incidents. A hazard reporting module interface 316 may list all hazards added over a certain time period, or a preset number of recent hazards. A management of change module interface 318 may list all hazards added over a certain time period, or a preset number of recent hazards.

FIG. 4 illustrates that the system may include an alert module 400 that permits a user to define an event to be watched 410, define a trigger value 420 for the selected event, and define at least one follow-up corrective action 430 for the selected trigger value. Each of these defined items may include various elements, such as an identification code 441, an indication of which employee initiated and/or owns the item 442, a creation date 443, a location code 444 for the event, one or more rules 445—such as "if/then" sequences—to determine when the event should be watched or trigger an alert. The alert module also may include automatically generated elements, such as a result 446 of the last implementation of the rules and a date and/or time 447 that the rules were last implemented.

Optionally, instead of each corrective action being manually selected, the system may automatically generate or more of the corrective actions. For example, the corrective action module may automatically generate a follow-up action that is used as the self-inspection corrective action for the self-inspection module, the incident-related corrective action for the incident reporting module, or the hazard-related corrective action for the hazard reporting module.

Referring back to FIG. 2, the corrective action module 200 may generate and display any or all of these automatically generated, module-specific corrective actions 257. As an example of an alert, the alert module may be configured with rules that: (i) cause the self inspection module to generate an alert to a tour leader when a self-inspection tour is due for a physical area of interest, (ii) provide the tour leader a profile of the physical area of interest and an instruction of observations to make for the physical area; and (iii) accept the self-inspection completion indication from the tour leader after the self-inspection tour is complete.

Figure 5:
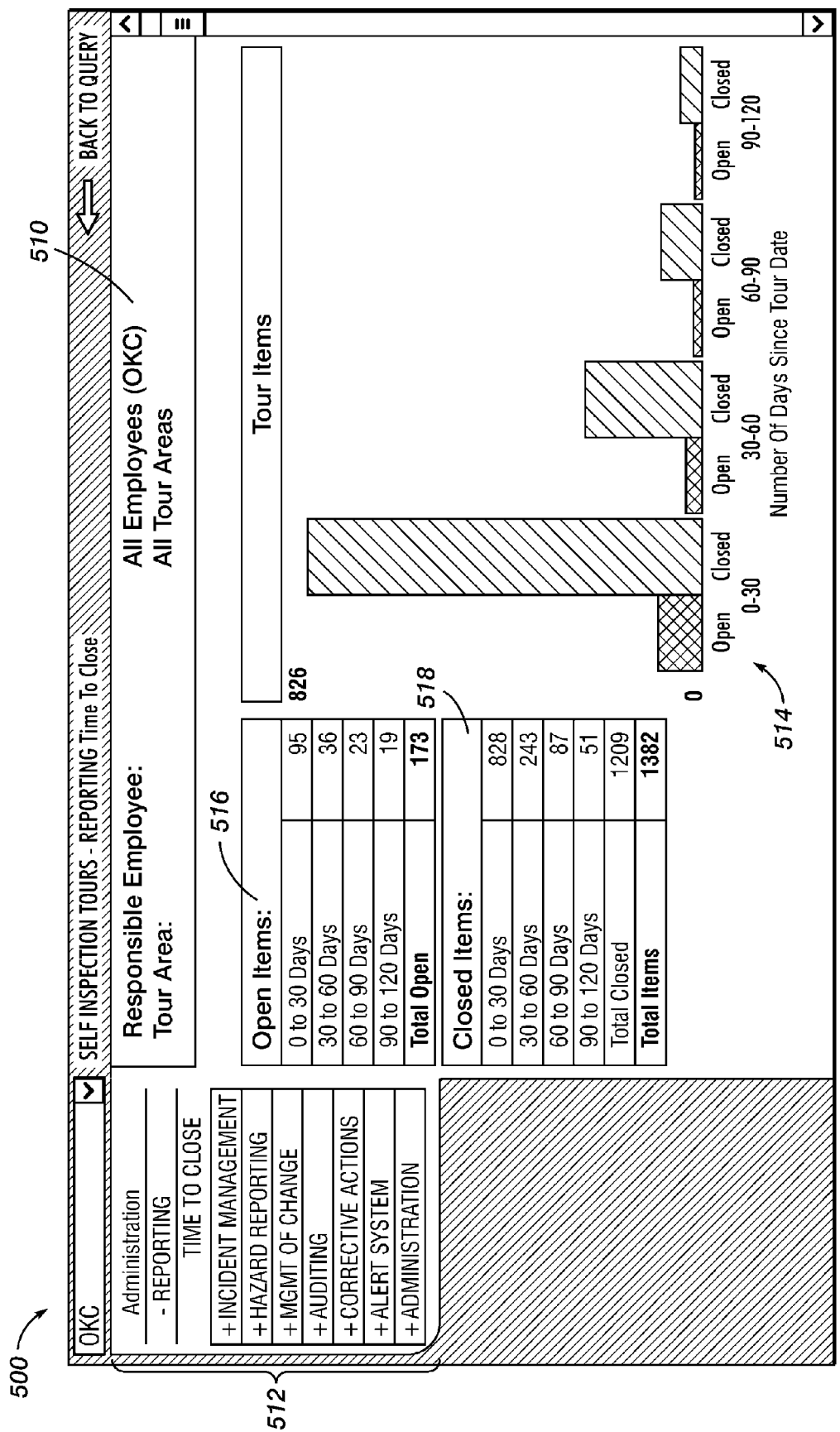
FIG. 5 illustrates an exemplary module that allows a user to measure self-performance, performance of various individuals, and performance of various worksites.

FIG. 5 illustrates an example of a module 500 that allows an employee and/or administrator or inspection tour leader to measure performance of individual employees, groups of employees, worksites or multiple worksites. For example, the module may include a configuration engine 510 that allows the administrator or tour leader to select criteria for the information to be displayed, such as employees and/or tour areas. Based on the authorization level of the user, the system may include a category selector 512 that allows the user to select a category for performance measurement. Based on the user's authorization level and the selected corrective action category, the system may automatically generate a report 514 of corrective action efficiency indicating information such as completed or closed corrective actions/time to completion 516, and open corrective actions/time pending 518.

Figure 6:
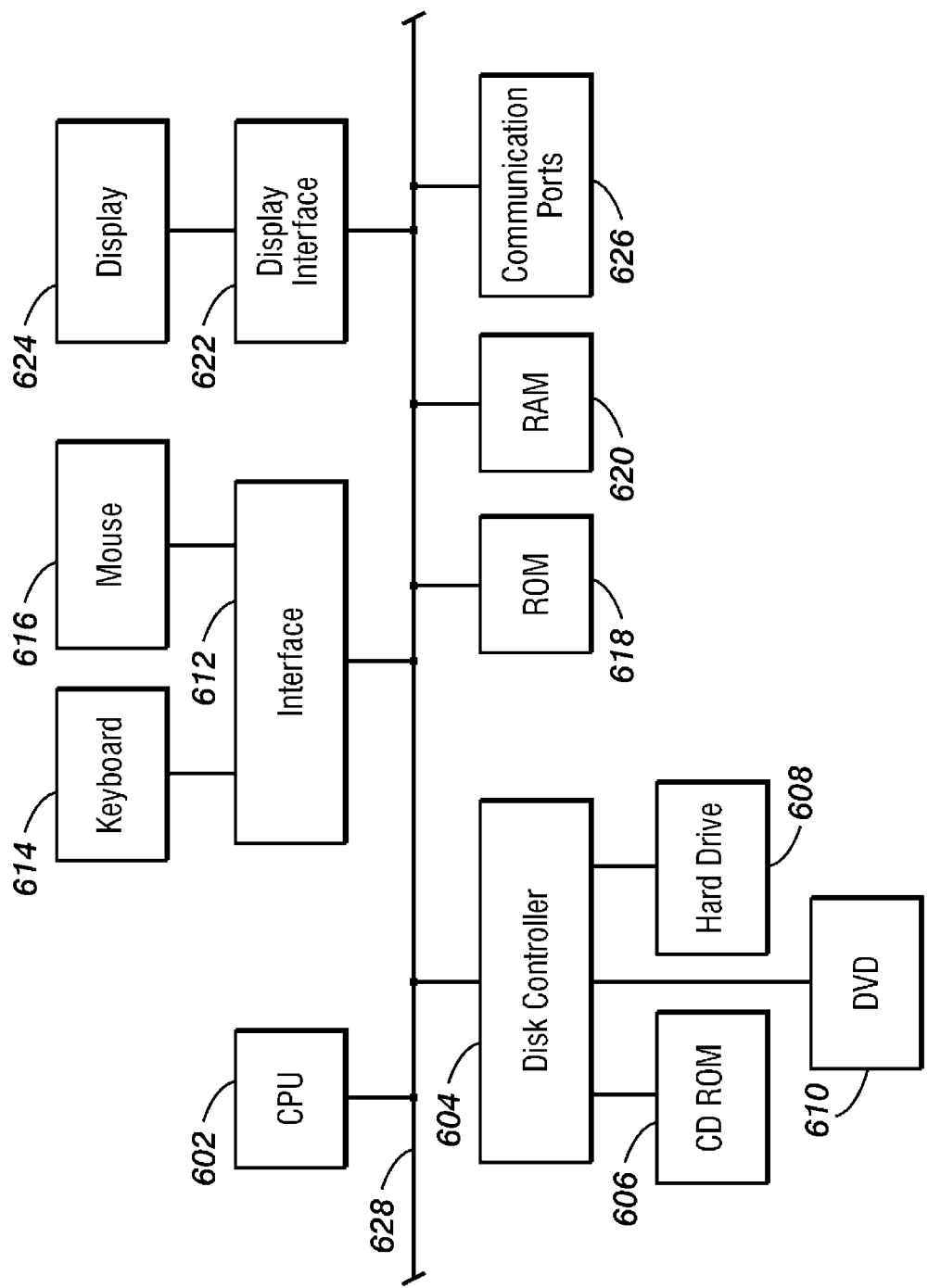
FIG. 6 is a block diagram illustrating exemplary elements of a computer system that may be used to implement the embodiments described herein.

FIG. 6 depicts a block diagram of an exemplary system that may be used to contain or implement program instructions according to an embodiment. Referring to FIG. 6, a bus 628 serves as the main information highway interconnecting the other illustrated components of the hardware. CPU 602 is the central processing unit of the system, performing calculations and logic operations required to execute a program. Read only memory (ROM) 618 and random access memory (RAM) 620 constitute exemplary memory devices or storage media.

A disk controller 604 interfaces with one or more optional disk drives to the system bus 628. These disk drives may include, for example, external or internal DVD drives 610, CD ROM drives 606 or hard drives 608. As indicated previously, these various disk drives and disk controllers are optional devices.

Program instructions may be stored in the ROM 618 and/or the RAM 620. Optionally, program instructions may be stored on a computer readable storage medium, such as a hard drive, a compact disk, a digital disk, a memory or any other tangible recording medium.

An optional display interface 622 may permit information from the bus 428 to be displayed on the display 624 in audio, graphic or alphanumeric format. Communication with external devices may occur using various communication ports 626.

In addition to the standard computer-type components, the hardware may also include an interface 612 which allows for receipt of data from input devices such as a keyboard 614 or other input device 616 such as a mouse, remote control, touch pad or screen, pointer and/or joystick.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. An integrated safety management system, the system comprising:
   a self inspection module comprising an electronic interface that accepts first data corresponding to a workplace site inspection, the first data comprising an inspection completion indicator, and one or more self-inspection corrective actions;
   an incident management module comprising an electronic interface that accepts second data corresponding to a safety-related incident, the second data comprising an incident descriptor, and one or more incident-related corrective actions;
   a workplace hazard reporting module comprising an electronic interface that accepts third data corresponding to a hazard review team finding, the third data comprising a hazard descriptor, and one or more hazard-related corrective action for a workplace facility;
   and
   a corrective action module that integrates the self-inspection corrective actions, the incident-related corrective actions, and the hazard-related corrective actions.

2. The system of claim 1, further comprising:
   a user interface dashboard that provides a user with access to the self-inspection module, the incident management module, the hazard reporting module, and the corrective action module.

3. The system of claim 1, in which the first data includes a first responsible employee indicator, the second data includes a second responsible employee indicator, and the third data includes a third responsible employee indicator, wherein the corrective action module automatically transmits the self-inspection corrective actions to the first responsible employee, the incident-related corrective actions to the second responsible employee, and the hazard-related corrective actions to the third responsible employee.

4. The system of claim 1, further comprising:
   an employee database containing identification data and system access permission data for a plurality of employees,
   wherein the permission data provides a level of authorization for each employee in the database to access or enter information contained in the inspection module, the incident management module, the hazard reporting module, and the corrective action module.

5. The system of claim 4, in which the first data includes a first responsible employee indicator, the second data includes a second responsible employee indicator, and the third data includes a third responsible employee indicator, wherein:
   the level of authorization for employees who are administrators permits the administrators to enter at least one of the first responsible employee indicator, the second responsible employee indicator, and the third responsible employee indicator; and the level of authorization for employees who are non-administrators does not permit the non-administrators to enter at least any of the first responsible employee indicator, the second responsible employee indicator, and the third responsible employee indicator.

6. The system of claim 1, wherein the corrective action module includes a configuration engine that permits an administrator to view corrective action information corresponding to criteria selected by the administrator.

7. The system of claim 1, wherein the corrective action module includes an alert engine that permits a user to select an event to be watched, select a trigger value for the selected event, and select at least one follow-up corrective action for the selected trigger value.

8. The system of claim 1, wherein the corrective action module automatically generates a follow-up action that is used as the self-inspection corrective action for the self-inspection module, the incident-related corrective action for the incident reporting module, or the hazard-related corrective action for the hazard reporting module.

9. The system of claim 1 wherein the self-inspection module:
generates an alert to a tour leader when a self-inspection tour is due for a physical area of interest,
provides the tour leader a profile of the physical area of interest and an instruction of observations to make for the physical area; and
accepts the self-inspection completion indication from the tour leader after the self-inspection tour is complete.

10. The system of claim 1, further comprising:
a management of change module comprising an electronic interface that accepts fourth data corresponding to a manufacturing process change, and automatically generates a corrective action descriptor indicating that a written operating procedure must be updated.

11. The system of claim 10, wherein the management of change module also:
assigns a fourth responsible employee to the corrective action descriptor, and automatically notifies the fourth responsible employee of the corrective action descriptor.

12. The system of claim 1, further comprising:
a lock out/tag out module that:
accepts fourth data corresponding to an indication that a fifth employee will join a work site area,
automatically determines whether the fifth employee is required to undergo lock out/tag out training, and
if the fifth employee is required to undergo lock out/tag out training, automatically generates a corrective action descriptor indicating that the fifth employee is required to undergo lock out/tag out training, and automatically notifies the fifth employee of the corrective action descriptor.

13. The method of claim 1, further comprising an auditing module that:
interfaces with the corrective action module to automatically communicate scheduled audits to responsible employees, received data corresponding to audit findings, correlates the findings to defined standards, and automatically generates audit-related corrective actions.

14. A method of managing occupational safety activity, the method comprising:
accepting, via an electronic interface, a selected event to be watched, a selected trigger value for the selected event, and an action for the selected trigger value;
receiving data corresponding to at least one of a site inspection, a workplace safety-related incident, and a workplace hazard review team finding;
determining whether the data corresponds to the selected event and the selected trigger value, and if so:
generating a corrective action requirement based on the accepted action;
and
automatically generating a notification of the corrective action requirement for a responsible employee.

15. The method of claim 14:
wherein the corrective action requirement comprises a workflow including a task for at least one additional employee, and the method further comprises:
notifying the additional employee of the task;
displaying, upon request of the responsible employee, a completion status for the task;
accepting, from the additional employee, an indication of completion of the task; and
changing the completion status after the indication of completion is accepted.

16. The method of claim 14, further comprising:
automatically determining an authorization level of a user;
receiving a selected a corrective action category from the user;
automatically identifying, based on the user's authorization level and the selected corrective action category, completed corrective actions and pending corrective actions for the user, and
automatically generating a report of corrective action efficiency based on the identified completed corrective actions and the identified pending corrective actions.

17. The method of claim 14, wherein the selected event comprises a self-inspection tour and the trigger value comprises a target date, and the method further comprises:
generating the notification when the received data corresponds to the target date, wherein the notification comprises an alert for the responsible employee, and
wherein the corrective action requirement comprises an instruction of observations to make for a physical area to be inspected.

18. The method of claim 14, further comprising providing a user, via the electronic interface, with a dashboard for entry and viewing of self-inspection data, incident management data, hazard reporting data, and corrective action data.

19. The method of claim 18, further comprising:
enabling the user, via the electronic interface, to selectively view:
corrective action data for which the user is a responsible employee;
corrective action data for a group of responsible employees under management of the user; and
corrective action data for a selected physical location.

20. The method of claim 19, further comprising enabling the user to select a time period for the selectively viewed corrective action data, and wherein the dashboard displays the selectively viewed corrective action data for the selected time period.

21. The method of claim 14, further comprising:
receiving, from the responsible employee, an indication that the corrective action has been closed, and;
after all corrective actions for the event have been closed, generating and displaying an indication of closure for the selected event.

* * * * *